Patented Dec. 7, 1926.

1,610,182

UNITED STATES PATENT OFFICE.

ELIHU THOMSON, OF SWAMPSCOTT, MASSACHUSETTS, ASSIGNOR TO GENERAL ELECTRIC COMPANY, A CORPORATION OF NEW YORK.

FUSED QUARTZ PRODUCT AND PROCESS OF PRODUCING SAME.

No Drawing.  Application filed December 28, 1923. Serial No. 683,262.

The present invention relates to production of shaped articles from quartz or silica, and its object is to produce by a molding process articles having substantially the physical properties of fused quartz.

Silica is capable of assuming a variety of allotropic modifications which are distinguishable by physical properties although they are all chemically identical, each consisting of silicon dioxide. In nature silica occurs as crystalline quartz of various forms, but all of the crystalline quartz varieties are convertible by fusion to a distinct physical modification known as a "fused quartz" or "quartz glass". Fused quartz is a structureless, vitreous material having a thermal expansion coefficient which is so low as to be substantially negligible. Due to the refractory nature of quartz it is difficult to produce large or intricate objects by molding a quartz fusion, particularly so as the fused quartz never becomes a mobile liquid which may be cast, but only a viscous mass which rapidly congeals when taken from a furnace.

In accordance with my invention, I have produced crucibles or other molded objects having substantially the properties of fused or vitreous quartz by molding small granules or fragments of fused quartz containing only sufficient cementing material to obtain coherence, but without destroying the low expansion property of fused quartz.

In carrying out my invention, quartz which has been subjected to fusion is broken up by crushing or grinding into small particles. The degree of fineness of the particles depends on the size and nature of the article to be made. The particles may be splintered and angular and may comprise a mixture of coarse and fine particles. The fused quartz particles are mixed with a small amount of a suitable, inorganic binder, such as kaolin, feldspar, silicate of soda, a refractory glass, or of suitable mixtures of these or other mineral substances. The amount of binder ordinarily should not exceed ten to fifteen per cent and preferably should be of a lesser amount. The mixture preferably is moistened with water, and if desired, a small amount of a temporary binder may be added, as for example, a carbonizable agglutinant, such as gum, sugar or starch, to assist in holding the particles together.

The mixture of fused quartz and binder is molded in any way as under pressure, dried and baked at a temperature sufficiently high to soften the vitreous binder, but not so high as to devitrify the fused quartz, say, a temperature of 900 to 1000° C. or less. For the molding of the fused quartz particles into objects of desired form, the known methods of molding refractory but non-plastic materials are employed, care being taken in all cases not to devitrify the glassy quartz. The resulting objects comprising particles of vitreous silica cemented together by the more fusible binder are strong and resistant to temperature changes.

What I claim as new and desire to secure by Letters Patent of the United States, is:—

1. A molded composition consisting largely of distinct particles of fused or vitreous quartz bound together with less than ten per cent of cementing material the thermal expansion coefficient of the mass as a whole being substantially as low as a homogeneous body of vitreous quartz.

2. A molded composition consisting of particles of silica in a vitreous state, and a vitreous material more fusible than silica, distributed between said silica particles in an amount not in excess of about fifteen per cent, the particles of silica being bound into coherent form by partial fusion of said binder, the composition having a thermal expansion coefficient substantially no higher than homogeneous fused quartz.

3. The method of fabricating articles having substantially the properties of fused or vitreous quartz which consists in converting by fusion to a vitreous state crystalline silica, mixing a small proportion of a more fusible vitreous material therewith, molding the mixture, and finally heating to a temperature sufficiently high to soften the binder but insufficient to fuse said silica.

4. The method of fabricating articles from vitreous silica which consists in comminuting vitreous silica into small angular particles, adding thereto a binder of more fusible vitreous material, shaping the mixture to desired form, and firing at a temperature of about 900 to 1000° C. to produce coherence.

5. A coherent, shaped article comprising fragments of vitreous silica of different sizes cemented together by a binder of vitreous material having a lower fusing point than silica.

In witness whereof, I have hereunto set my hand this 24th day of December, 1923.

ELIHU THOMSON.